Figure 1:
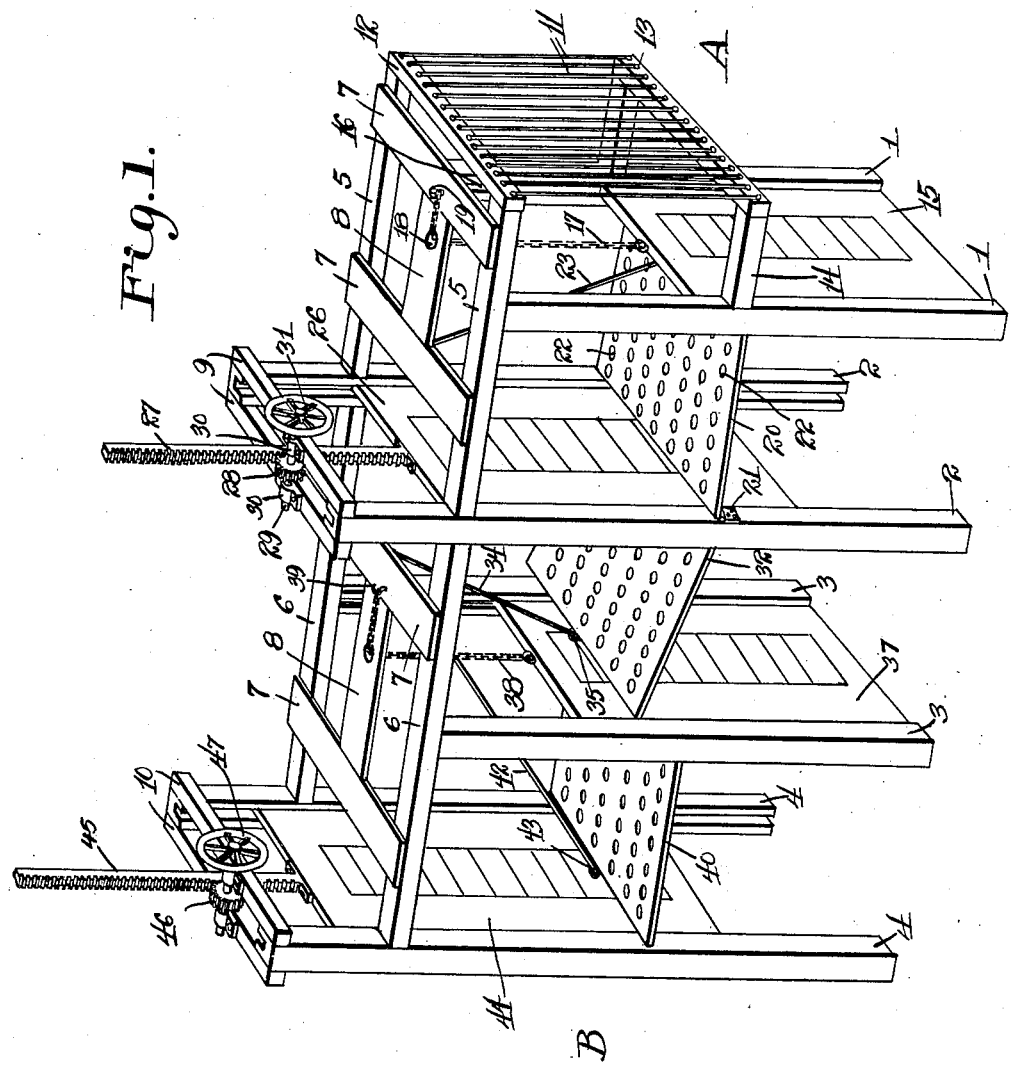

C. C. ROTH.
FISH STOP MECHANISM.
APPLICATION FILED SEPT. 23, 1913.

1,097,266.

Patented May 19, 1914.
3 SHEETS—SHEET 1.

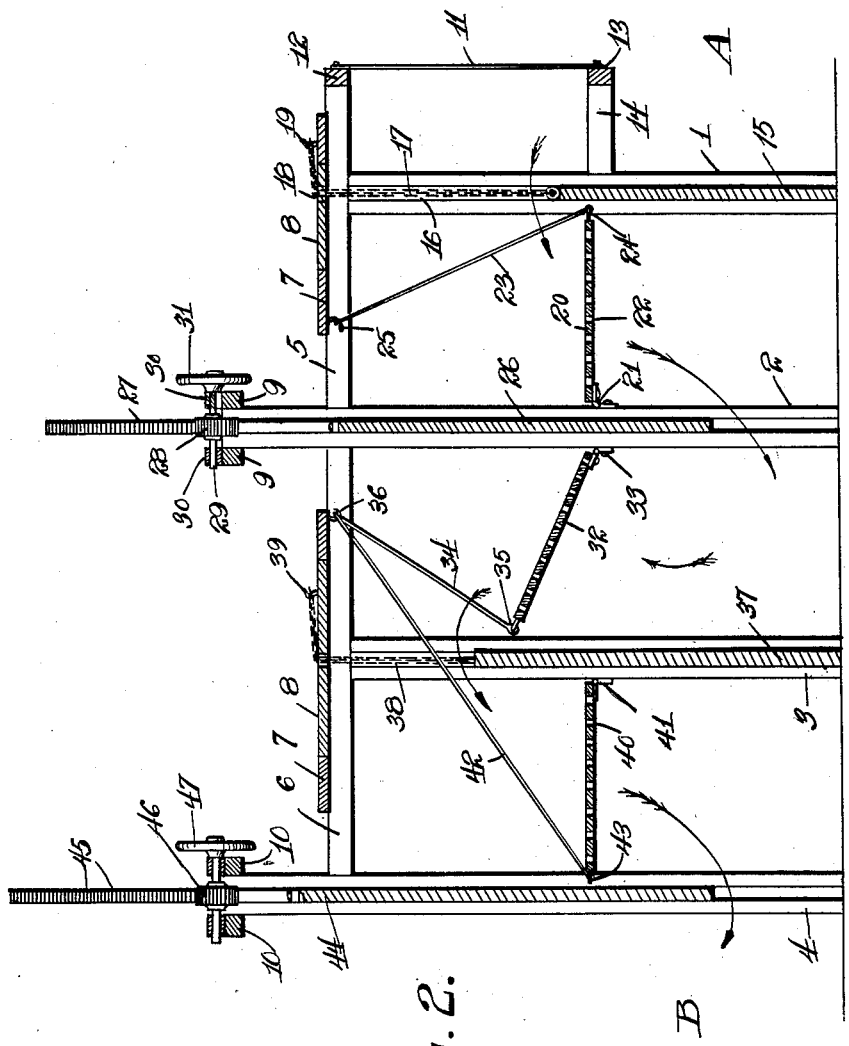

C. C. ROTH.
FISH STOP MECHANISM.
APPLICATION FILED SEPT. 23, 1913.
1,097,266.
Patented May 19, 1914.
3 SHEETS—SHEET 3.
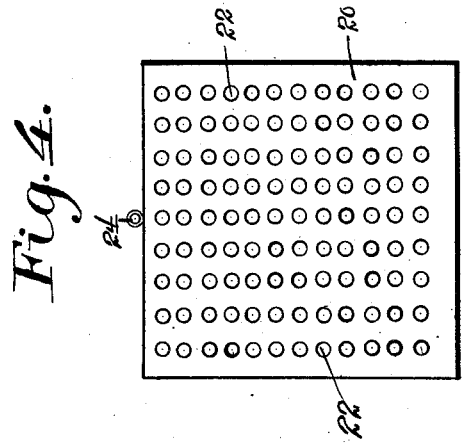
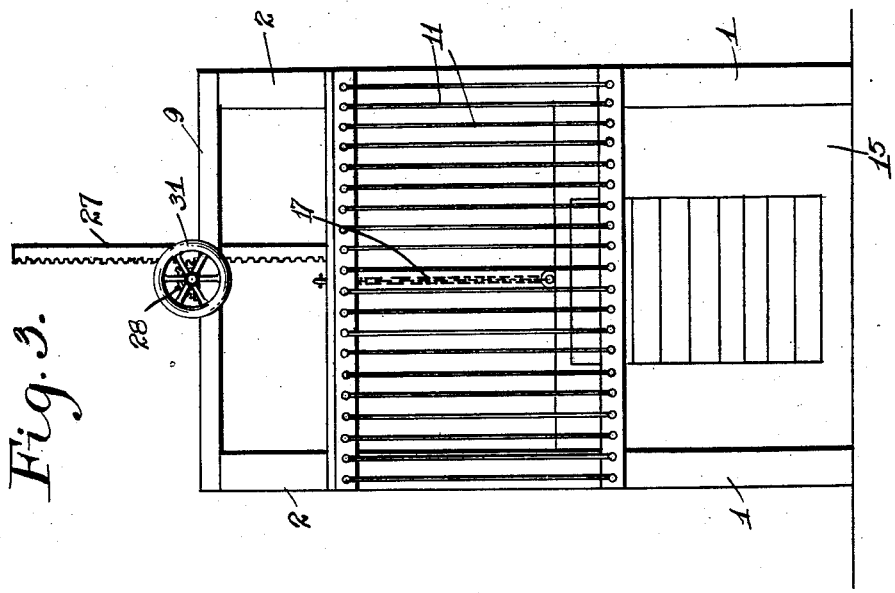
Witnesses
Wm. H. Mulligan.
C. H. Crawford
Inventor
Charles C. Roth,
By
his Attorney

UNITED STATES PATENT OFFICE.

CHARLES C. ROTH, OF CHICAGO, ILLINOIS.

FISH-STOP MECHANISM.

1,097,266.  Specification of Letters Patent.  Patented May 19, 1914.

Application filed September 23, 1913. Serial No. 791,387.

*To all whom it may concern:*

Be it known that I, CHARLES C. ROTH, a citizen of the United States, residing at Chicago, in the county of Cook and State of Illinois, have invented certain new and useful Improvements in Fish-Stop Mechanisms, of which the following is a specification.

This invention relates to improvements in fish stopping mechanism for preventing fish from entering a stream, channel, or conduit, the device of my invention being capable of performing its function under any conditions in which such device may be used.

It is one of the objects of the invention to provide or arrange a plurality of elements so as to deflect a stream in directions angular to its normal course, in order to provide for arresting progress of the fish, and in the most improved embodiment of the invention, said elements are arranged to successively change the course of a stream from its normal direction of flow in upward and downward directions.

A further object consists in so arranging and constructing said deflecting elements so that they can perform their function with as little resistance as possible so as to avoid damming a stream and raising a head of water in advance of the point in which such device is located.

A further object of the invention is to provide adjustable means for the stream deflecting elements so that a greater or less deflection of the stream may be afforded in cases where the fish are of small size and also where the fish are not abundant.

A further object is to interpose between the stream deflecting elements, a plurality of fish stops which are not only constructed to prevent passage of the fish therethrough, but which are also disposed in a plane angular to any plane or direction in which a fish normally swims.

Other objects will be more fully described in connection with the accompanying drawings and more particularly pointed out in and by the appended claims.

In the drawings: Figure 1, is a perspective view of a fish stopping mechanism embodying one form of my invention. Fig. 2, is a longitudinal, vertical sectional view of Fig. 1. Fig. 3, is an end view looking from the right of Fig. 1. Fig. 4, is a plan view of one of the fish stop elements detached from the mechanism.

Like characters of reference designate similar parts throughout the different figures of the drawings.

Referring to the specific form shown, 1, 2, 3, and 4, designate bars or guides which are in the form of upright frame members. The upright guides or frame members are connected with longitudinal frame members 5 and 6, and the latter are braced in spaced relation by frame work which may conveniently consist of transverse planking forming platforms so as to facilitate access by operator to parts necessitating adjustment. The planks 7, are transversely disposed with respect to the frame work, and planks 8, may be connected with planks 7, and are longitudinally disposed with respect thereto. Guide uprights 2 and 4, preferably extend above longitudinals 5 and 6, and are shown connected at their upper ends by journal supports 9 and 10.

A, designates the entrance, and B, the discharge end of the mechanism, and at the entrance I preferably provide a refuse arrester which may be in the form of a grate composed of rods or bars 11, secured to grate supports 12 and 13. The grate support 12, which may be in the form of a bar, which is mounted on longitudinal frame members 5 and 6, and the grating bar support 13, is shown mounted upon extensions 14, projecting from the guide uprights 1. In the guide uprights 1, I mount a stream deflecting element which may comprise a gate 15, having its side edges slidable in the grooves 16, formed in said uprights. The gate 15, will normally seek a downward position by gravity and I provide means for elevating the same which may be in the form of a chain 17, connected to said gate. The chain 17, may extend through an opening 18, on one of the planks 8 and be fastened in adjusted positions to a stop 19. The gate 15, is relatively reduced in height with respect to its guide ways and the entire frame work will be disposed or suitably mounted in the channel or ditch so that the gate 15, can be lowered to the bottom position shown in Fig. 1. The height of the gate 15, may be proportioned relatively to the lowest depth of the stream although no great accuracy in this respect is necessary as this feature is taken care of by the remaining elements which will presently be described. It may be assumed however, that in the present embodiment, the level of the stream is slightly above the top of the gate 15, and that the level may vary above and below its normal. It will thus be seen that the bars 11, will arrest rubbish such as weeds, grass and the like which may be floating on the surface, so as not to clog parts of the mechanism which will be presently described.

Rearwardly of the deflecting gate 15, I provide a fish stop 20, which may be in the form of a perforated plate adapted to be hingedly mounted to guide uprights 2, as indicated at 21. Perforations 22, are comparatively large so as to provide for a large flow capacity therethrough and prevent damming of the water as much as possible. Means such as a rod 23, connected with said fish stop 20, as at 24, and with one of the platforms as at 25, serves to support the fish stop 20, in a position angular to the deflector gate 15, which latter is shown imperforate. The stop 20 is shown, adjusted in a horizontal position. In the upright guides 2, I slidably mount in the guide ways thereof, an imperforate stream deflecting gate 26. Means is provided for positively adjusting the gate 26, upwardly or downwardly in its guides and I have shown the same provided with a rack 27, with which a pinion 28 meshes. The pinion 28, is mounted on a shaft 29, journaled in the bearings 30, the latter being mounted on bearing supports 9. An operating member which may be in the form of a hand wheel 31, affords means for operating the gate 26. The gate 26, will take care of the varying elevations of the stream and may be adjusted to such elevation as will force or deflect the water running over the top of gate 15, downwardly through the openings in the fish stop 20, so as to provide for the first deflection of the stream in a downward direction. It will be seen that irrespective of the level of the stream, within given limits, the gate 26, may be adjusted to force downward movement thereof. It is well known that fish rarely if ever, swim in downwardly vertical directions and they always avoid passing through a small opening, even though the opening is large enough to accommodate passage of the fish therethrough. Thus it will be seen that any fish which may have passed over the gate 15, will be caught by the fish stop 20, and deflector 26. However, I provide successively acting deflectors and fish stops in cases where the current may have been sufficiently swift to force the fish through the devices providing the first deflection of the stream.

A fish stop 32, is hinged at 33, to guide uprights 2, and is of the perforate type similar to stop 20. The fish stop 32, may be supported in a horizontal or inclined position as by a rod or cable 34, connected therewith as at 35, and adapted to be adjustably secured at 36 to one of the platforms. Rearwardly with respect to the fish stop 32, and in guide uprights 3, I provide a deflecting gate 37, similar to the deflecting gate 15, but preferably of greater height. The function of gate 37, will be to deflect the stream upwardly through the fish stop 32, and dam the stream sufficiently to cause it to flow over the top of gate 37. The gate 37, will be provided with adjustable means which may comprise a chain 38, adapted to be adjustably connected to one of the platforms at 39. Rearwardly of the gate 37, I mount a final fish stop 40, which is similar in construction to the fish stops 20 and 32, the said final stop 40, being hinged at 41, and operated by cable or like suspension means 42, shown secured to said stop at 43, and adapted for adjustable anchorage at 36. A final gate deflector 44, is slidably mounted in upright guides 4, and is provided with rack and pinion operating means, similar to that provided for gate 26. The rack is indicated at 45, and the pinion at 46, the latter being operable by a hand wheel 47.

It will be understood that the sides of the structure will be banked or inclosed in such a manner as to confine the stream passing through the mechanism in the path prescribed by the deflectors. Arrows are shown in Fig. 2, which designate the path of the stream. Any fish trapped in front of the gate 26, could be readily extricated by nets above the fish stop 20. Should any fish pass below the gate 26, and be trapped in front of the gate 37, the fish stop 32, could be elevated to net out the fish. The operation of extricating the fish which might reach stop 40, would be the same as that indicated in connection with stop 20. It will be readily seen that in connection with stops 20 and 40, the latter could be readily elevated so as to collect the fish and permit of their removal by hand, if desired.

While resistance to the stream can not be entirely avoided in interposing a fish stop in the course thereof, it will be seen that my improved mechanism offers a minimum resistance so as to reduce damming action as much as possible, and in cases where too great a resistance is afforded by the entrance gate 15, the latter can be slightly elevated so as to relieve damming action of the current and permit water to flow under gate 15, to gate 37, the same functioning as an upward deflector when in a normal position. Furthermore, the openings in the fish stops may be relatively large by reason of the fact that they are located in a manner or in a plane which would be contrary to any normal direction in which the fish would swim.

It is believed that the utilities and advantages of the invention will be fully understood and while I have herein shown and described one specific form of my invention I do not wish to be limited thereto except for such limitations as the claims may import.

I claim:

1. A fish stop mechanism comprising a plurality of elements for deflecting a stream in directions angular to its normal course, and fish stop elements interposed between said deflecting elements, substantially as described.

2. A fish stop mechanism comprising in combination, a plurality of elements for deflecting a stream in angular directions to its normal course, stop elements interposed between said deflecting elements, and means for adjusting said fish stop elements, substantially as described.

3. A fish stop mechanism comprising in combination, a plurality of imperforate vertically disposed elements for deflecting a stream in angular directions from its lower course, and horizontally disposed perforate fish stop elements interposed between said deflecting elements, substantially as described.

4. A fish stop mechanism comprising in combination, a plurality of vertically disposed elements for deflecting a stream in angular directions from its normal course, and horizontal fish stop elements between said deflecting elements, substantially as described.

5. A fish stop mechanism comprising in combination, a plurality of vertically adjustable elements for successively deflecting the stream upwardly and downwardly from its normal course, and fish stop elements adjustably mounted between said deflecting elements, substantially as described.

6. A fish stop mechanism comprising in combination, a plurality of elements for deflecting a stream upwardly from its normal course, alternately disposed elements for deflecting the stream downwardly after each upward deflection, and fish stops interposed in the path of the upwardly and downwardly deflecting streams, substantially as described.

7. A fish stop mechanism comprising in combination, a pair of gate elements of increasing height with respect to the deflection of flow of the stream for deflecting the same upwardly from its normal level, adjustable means between said elements for deflecting the stream downwardly, and fish stops interposed in the path of the upwardly and downwardly deflecting means substantially as described.

8. A fish stop mechanism comprising an entrance deflector for deflecting the stream upwardly thereover, means rearwardly of said entrance deflector and adjustable to different elevations corresponding to relative levels of the stream for deflecting the same downwardly, and a fish stop between said elements and means, substantially as described.

9. A fish stop mechanism comprising in combination, a series of stream deflecting elements and fish stop elements, and rubbish arresting means in advance thereof with respect to the direction of flow of the stream, substantially as described.

10. A fish stop mechanism comprising in combination, a frame work including upright guides, gates slidable in said guides, means for adjusting said gates in said guides to successively deflect the stream in upward and downward directions, fish stops disposed between said gates and hingedly mounted on said upright guides, and means for adjusting said fish stops, substantially as described.

11. A fish stop mechanism comprising in combination, a frame work including upright guides, gates slidably mounted in said guides, means for elevating certain of said gates, and means for positively raising or lowering the remaining gates, substantially as described.

12. A fish stop mechanism comprising in combination, devices for deflecting a stream angularly along the direction of its flow upwardly and downwardly, and a fish stop comprising a perforate plate interposed between said devices, substantially as described.

13. A fish stop comprising in combination, mechanism for deflecting a stream from its normal course, and a fish stop means in that area of the stream deflected by said mechanism, substantially as described.

14. A fish stop comprising in combination, mechanism for deflecting a stream successively in different angular courses with respect to its normal course, and fish stop means in those areas of the stream deflected by said mechanism, substantially as described.

In testimony whereof I affix my signature in presence of two witnesses.

CHARLES C. ROTH.

Witnesses:
WILLIAM M. BARTZ,
JOHN NEUBAUER.

---

Copies of this patent may be obtained for five cents each, by addressing the "Commissioner of Patents, Washington, D. C."